No. 677,117. Patented June 25, 1901.
C. W. COOPER & A. P. BJERREGAARD.
APPARATUS FOR MAKING VARNISH.
(Application filed July 9, 1897. Renewed July 17, 1900.)
(No Model.) 2 Sheets—Sheet 1.
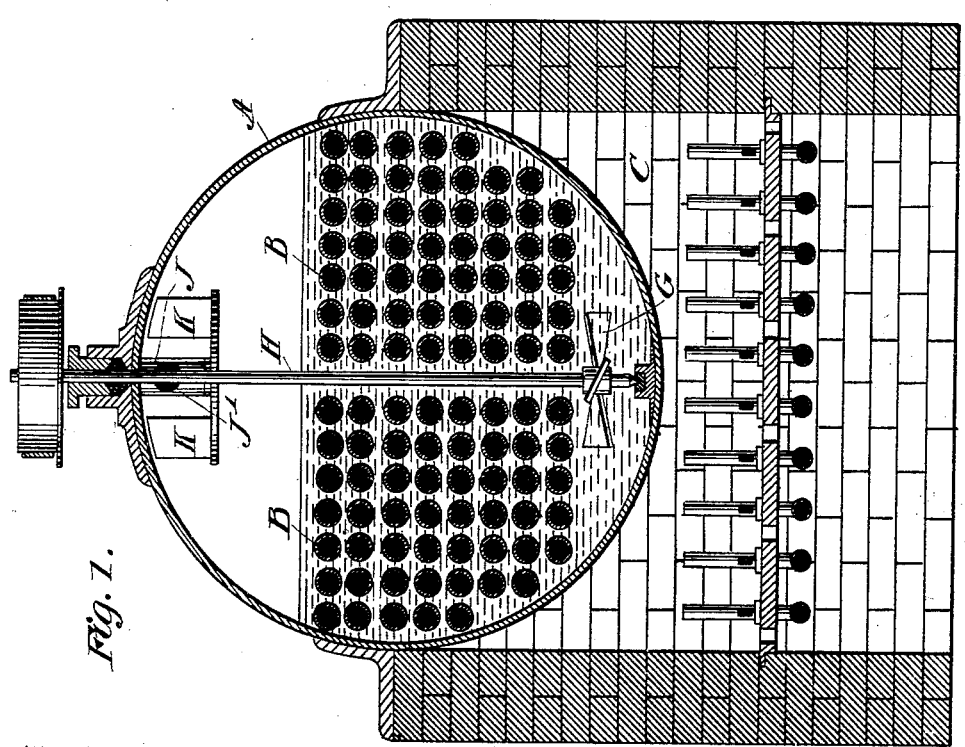
WITNESSES:
Frank S. Orr
H. M. Skinner
INVENTORS
Charles W. Cooper
August P. Bjerregaard.
BY
ATTORNEY No. 677,117. Patented June 25, 1901.
C. W. COOPER & A. P. BJERREGAARD.
APPARATUS FOR MAKING VARNISH.
(Application filed July 9, 1897. Renewed July 17, 1900.)
(No Model.) 2 Sheets—Sheet 2.
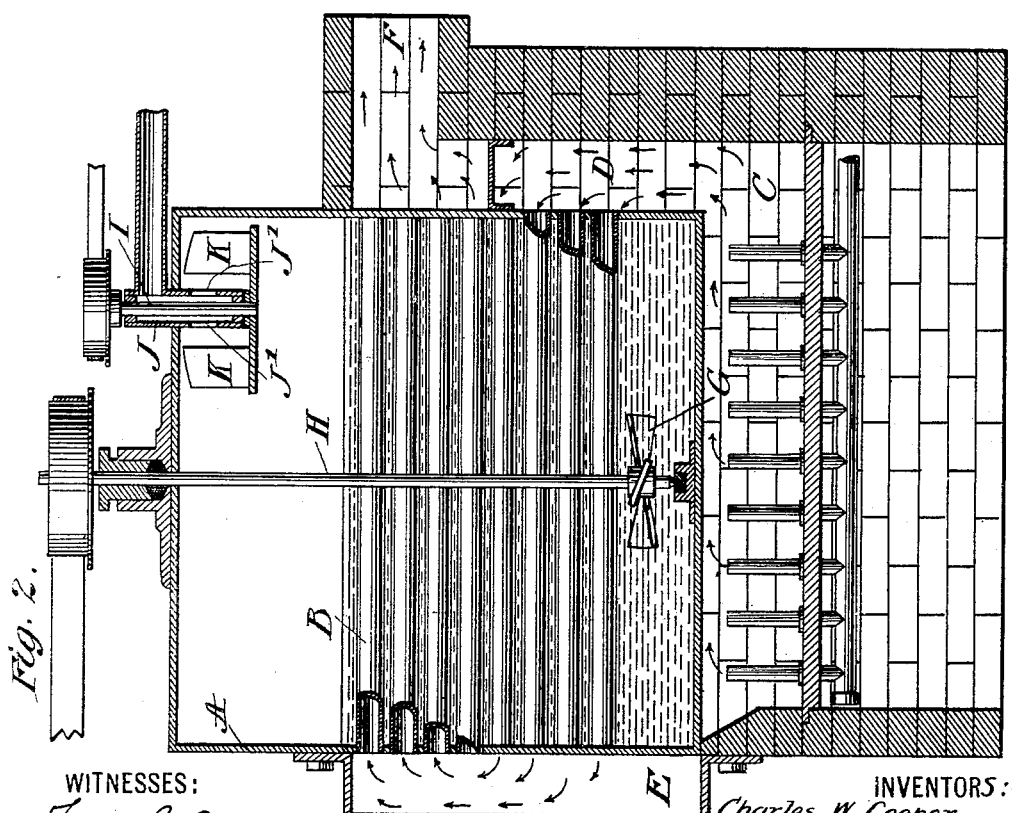

UNITED STATES PATENT OFFICE.

CHARLES W. COOPER, OF NEW YORK, AND AUGUST P. BJERREGAARD, OF MOUNT VERNON, NEW YORK; SAID BJERREGAARD ASSIGNOR TO SAID COOPER.

APPARATUS FOR MAKING VARNISH.

SPECIFICATION forming part of Letters Patent No. 677,117, dated June 25, 1901.

Application filed July 9, 1897. Renewed July 17, 1900. Serial No. 23,932. (No model.)

*To all whom it may concern:*

Be it known that we, CHARLES W. COOPER, residing at New York, New York county, and AUGUST P. BJERREGAARD, residing at Mount Vernon, Westchester county, New York, citizens of the United States, have invented certain new and useful Improvements in Apparatus for Making Varnish, of which the following is a full, clear, and exact description.

Our invention relates to an apparatus for manufacturing varnish, the object being to simplify and expedite the process of manufacturing this product.

The apparatus herein described serves as a means whereby a given number of skilled operatives can produce a far greater quantity of the finished product in a given time than could be produced by the employment of any other apparatus now used for this purpose.

The apparatus described is particularly useful in carrying out the invention described and claimed in the United States Letters Patent granted on July 25, 1899, to August P. Bjerregaard, one of the applicants herein.

In the drawings, Figure 1 is a vertical cross-section through substantially the center of the apparatus. Fig. 2 is a longitudinal vertical section of said apparatus, taken on a plane at right angles to the section shown in Fig. 1.

A is the casing of a boiler. B B are tubes therein.

C is a furnace adapted, by preference, to burn oil or gas, so that igniting, regulating, and extinguishing of the flame may be quickly and easily accomplished, whereby the temperature may be readily and accurately controlled. At one end of the furnace there is an inclosed space D, through which heat may pass directly into and through the heating-tubes B. If desirable, another space E may be provided at the opposite end of the boiler A', whereby the heat may be repassed through the boiler by means of return tubes and flues. This passing and repassing of the hot air or products of combustion may be repeated as often as it is desirable, the exit being through a suitable flue or chimney F.

G is a liquid agitator or mixer comprising blades or paddles. These blades may be attached to a suitable revoluble spindle H or its equivalent, the rotation of which effectively agitates the contents of the boiler. Obviously any other equivalent means may be employed for effecting the mechanical agitation and mixing of the contents. Above the level of the liquid and preferably near the top of the boiler is an opening, adjacent to which is mounted a suitable spindle I. A tube J, which in this specific form is shown around the spindle and of greater diameter, provides an outlet for the vapor or gas generated in the boiler, said tube being provided with suitable perforations or vent-openings J'. Obviously this outlet may be modified as desired without departing from the spirit or scope of the invention. Affixed to the spindle I and located within the boiler is a suitable fan K, serving the purpose of a centrifugal separator or foam-breaker. Suitable means is provided to rotate the spindle I at a speed sufficient to accomplish the desired end, which is to break up the foam or bubbling contents of the boiler, thereby releasing the gas contained in the bubbles and allowing it to pass out through the pipe J, which is so positioned with relation to the foam-separator that the liquid contents of the boiler are driven away by the rotation of the foam-separating device. The gas, however, being under slight pressure, readily passes out through the aforesaid vent. This breaking up of the bubbles by the separator K causes the solid or liquid portion thereof to be thrown laterally away from said separator, whereupon it returns by gravity to the liquid mass.

In operation the mixture (oil and raw gum) is poured into the boiler and a sufficient space is left in the top of the boiler for the gas and foam to separate from the liquid mass, which latter should be supplied in a quantity sufficient to cover all the heating-surfaces—that is to say, the highest heat-conducting pipe should always be covered by the liquid. Heat is then applied by lighting the burners until the liquid contents have been sufficiently boiled. Meanwhile the foam-separator is being rotated to effect the ends previously referred to, and after the gum is sufficiently softened or quite melted by the heat the agitator is set in motion to thoroughly mix the contents.

By the use of this apparatus the mixture of oil and raw gum may be quickly boiled to a point where the product responds to the desired varnish test. The provision of the foam-separator prevents the boiling over of the liquid mass, and consequently prevents injury to the product or danger of conflagration, which might result should any of the boiled oil escape and come in contact with the fire. We have found that by the use of this apparatus the finished product possesses great uniformity.

This apparatus is entirely practicable in boiling varnish in which the gum has been previously melted and mixed with oil, (which is the common old well-known process,) although it is more economical to mix the raw gum and oil in one batch in the boiler and then treat it as before described.

What we claim is—

1. In an apparatus for making varnish, a boiler, a multiple heating-surface therein, a mechanical separator in the upper portion thereof, comprising a rotary spindle carrying suitable arms, and a gas-outlet adjacent thereto.

2. In an apparatus for making varnish, a boiler, multiple heating-surfaces therein, a mechanical separator for the foam, said separator comprising a rotary spindle carrying suitable arms, a gas-outlet adjacent thereto, and a liquid agitator independent of the foam-separator.

3. In an apparatus for making varnish, a boiler, a mechanical separator for the foam, said separator comprising a rotary spindle carrying suitable foam-breakers, a gas-outlet adjacent thereto, and a liquid-agitator.

Signed at New York, in the county of New York and State of New York, this 8th day of July, 1897.

CHARLES W. COOPER.
AUGUST P. BJERREGAARD.

Witnesses:
R. C. MITCHELL,
H. M. SKINNER.